US007099779B2

(12) United States Patent
Niki

(10) Patent No.: US 7,099,779 B2
(45) Date of Patent: Aug. 29, 2006

(54) INFORMATION PROCESSING APPARATUS, MONITORING METHOD AND PROGRAM, AND MEMORY MEDIUM

(75) Inventor: Toru Niki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 10/417,089

(22) Filed: Apr. 17, 2003

(65) Prior Publication Data

US 2003/0200035 A1 Oct. 23, 2003

(30) Foreign Application Priority Data

Apr. 22, 2002 (JP) ...................................... 2002-119205
Apr. 2, 2003 (JP) ...................................... 2003-099302

(51) Int. Cl.
*G06F 19/00* (2006.01)

(52) U.S. Cl. ......................................... 702/33; 702/127

(58) Field of Classification Search ..................... 347/7, 347/19, 85, 86, 87, 2, 3, 5; 702/33, 45, 50, 702/55, 127, 128; 358/1.14, 1.15; 399/8, 399/12, 23, 24, 27, 25
See application file for complete search history.

(56) References Cited

U.S. PATENT DOCUMENTS

| | | | | | |
|---|---|---|---|---|---|
| 5,008,711 | A | * | 4/1991 | Sakamoto et al. | 399/24 |
| 5,155,527 | A | * | 10/1992 | Gokita et al. | 399/29 |
| 5,305,199 | A | | 4/1994 | LoBiondo et al. | 364/403 |
| 5,404,201 | A | * | 4/1995 | Umeda et al. | 399/8 |
| 5,594,529 | A | * | 1/1997 | Yamashita et al. | 399/8 |
| 5,635,972 | A | * | 6/1997 | Maruyama et al. | 347/158 |
| 5,771,420 | A | * | 6/1998 | Suzuki et al. | 399/25 |
| 5,802,146 | A | * | 9/1998 | Dulman | 379/32.03 |
| 5,997,121 | A | * | 12/1999 | Altfather et al. | 347/7 |
| 6,023,593 | A | * | 2/2000 | Tomidokoro | 399/8 |
| 6,029,145 | A | * | 2/2000 | Barritz et al. | 705/34 |
| 6,227,638 | B1 | * | 5/2001 | Childers et al. | 347/7 |
| 6,332,062 | B1 | * | 12/2001 | Phillips et al. | 399/12 |
| 6,360,174 | B1 | * | 3/2002 | Shoki | 702/55 |
| 6,556,890 | B1 | * | 4/2003 | Whaley | 700/244 |
| 6,556,926 | B1 | * | 4/2003 | Haines | 702/34 |
| 6,588,870 | B1 | * | 7/2003 | Aruga et al. | 347/5 |
| 2002/0083164 | A1 | * | 6/2002 | Katayama et al. | 709/223 |
| 2003/0040984 | A1 | | 2/2003 | Inami et al. | 705/27 |
| 2003/0050873 | A1 | | 3/2003 | Niki | 705/28 |

FOREIGN PATENT DOCUMENTS

| | | | |
|---|---|---|---|
| EP | 0 715 221 | | 6/1996 |
| EP | 1 205 816 A1 | | 5/2002 |
| EP | 1 296 267 A2 | | 3/2003 |
| JP | 08-152824 | * | 6/1996 |
| JP | 2004-038856 | * | 5/2004 |

OTHER PUBLICATIONS

Patent Abstracts of Japan, vol. 2000, no 25, Apr. 12, 2001 (JP 2001-228760).

* cited by examiner

*Primary Examiner*—Michael Nghiem
*Assistant Examiner*—Douglas N Washburn
(74) *Attorney, Agent, or Firm*—Fitzpatrick, Cella, Harper & Scinto

(57) ABSTRACT

In a network print environment in which printers of various residual amount outputting methods exist mixedly, in an information processing apparatus for monitoring a supplement of consumables which are used in the printer which can communicate via a communication line in order to recognize that consumables have properly and newly been supplemented in each printer, there is provided a mechanism having a discriminating unit for discriminating whether the consumables have newly been supplemented into the printer or not by a discriminating method according to the residual amount outputting method of the consumables of the printer.

3 Claims, 6 Drawing Sheets

FIG. 6

601 602

| | |
|---|---|
| C COMPANY PRINTER 1000 | 1 |
| C COMPANY PRINTER 1100 | 1 |
| C COMPANY PRINTER 1200 | 0 |
| C COMPANY PRINTER 2000 | 0 |
| C COMPANY PRINTER 2100 | 1 |
| .... | .... |
| .... | .... |

FIG. 7

BLACK & WHITE TONER 701 702

| | |
|---|---|
| C COMPANY PRINTER 1000 | CTB10 |
| C COMPANY PRINTER 1100 | CTB10 |
| C COMPANY PRINTER 1200 | CTB10 |
| C COMPANY PRINTER 2000 | CTB20 |
| C COMPANY PRINTER 2100 | CTB20 |
| .... | .... |
| .... | .... |

COLOR TONER (YELLOW)

| 801 | 802 |
|---|---|
| C COMPANY COLOR PRINTER 600 | CTY6 |
| C COMPANY COLOR PRINTER 610 | CTY6 |
| C COMPANY COLOR PRINTER 700 | CTY7 |
| C COMPANY COLOR PRINTER 710 | CTY7 |
| .... | .... |
| .... | .... |

INFORMATION PROCESSING APPARATUS, MONITORING METHOD AND PROGRAM, AND MEMORY MEDIUM

BACKGROUND OF THE INVENTION

1. Field of the Invention

The invention relates to an information processing apparatus, monitoring method and program, and a memory medium, in which management of a residual amount of consumables of an image forming apparatus such as printer, copying apparatus, or the like is made and management of a stock of the consumables is also made in accordance with the residual amount management.

2. Related Background Art

As a technique for managing a stock of toner cartridges which are used in OA apparatuses, according to a patent literature 1, there has been known a mechanism such that copying apparatus management devices connected to copying apparatuses in a one-to-one correspondence relational manner receive a toner empty signal and paper feed number data of each paper feed cassette from the copying apparatuses and update stock data of the toner cartridges, for example, in accordance with the reception of the toner empty signal.

As methods of outputting a toner residual amount or information corresponding to the toner residual amount from an image forming apparatus including the copying apparatus to an external apparatus, there have been known various outputting (detecting) methods such as method of outputting residual amount information of two, three, or more levels on the basis of an detection output of a sensor provided in the toner cartridge, method of outputting information indicative of the number of print sheets as a parameter of a consumption degree of the toner to the external apparatus, and the like.

[Patent Literature 1]

JP-A-08-152824

Since use of the image forming apparatus which adopts the various toner residual amount detecting methods and the methods of outputting the detected residual amount as described above is presumed in an actual office network environment, a mechanism such that the stock management can be made by unitarily managing the residual amount information, exchange of the toner cartridge, and the like in such an environment is demanded.

SUMMARY OF THE INVENTION

The invention is made in consideration of the above problems and it is an object of the invention to provide an information processing apparatus which can flexibly monitor an exchange of consumables in a network image forming environment in which various outputting (detecting) methods of a residual amount of the consumables exist mixedly. According to the invention, there is provided an information processing apparatus in which a plurality of printing apparatuses that can communicate via a communication line are monitored and stock management associated with a supplement of consumables which are used as a recording material for a recording medium is unitarily made with respect to the plurality of printing apparatuses, wherein the apparatus has discriminating means for discriminating whether the consumables have newly been supplemented into the printing apparatus or not by a discriminating method according to a residual amount outputting method of the consumables of the printing apparatus.

According to the invention, a mechanism such that, unlike the conventionally well-known stock management system such that only a specific copying apparatus is presumed as a target, the stock management of each image forming apparatus can be unitarily and accurately made in the network image forming environment in which the various outputting (detecting) methods of the residual amount of the consumables exist mixedly can be realized.

BRIEF DESCRIPTION OF THE DRAWINGS

FIG. 6 is a diagram showing a table for making a discrimination about whether toner amount information can be outputted on the basis of model names in the embodiment;

FIG. 7 is a diagram showing a table for specifying a type of consumables from the obtained model name in the embodiment;

DETAILED DESCRIPTION OF THE PREFERRED EMBODIMENTS

First Embodiment

The first embodiment of the invention will be described hereinbelow with reference to the drawings.

Figure 1:
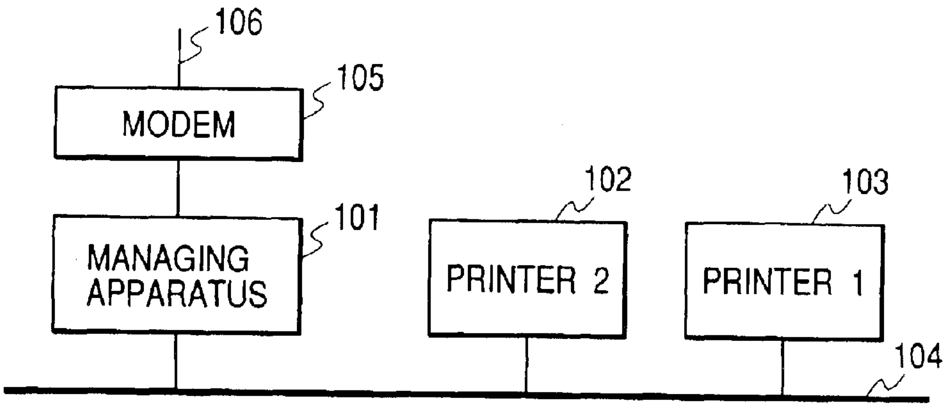
FIG. 1 is a block diagram of a consumables stock management system according to the first embodiment of the invention.

FIG. 1 is a block diagram showing a schematic construction of a consumables stock management system (cartridge exchange recognition system) in the embodiment. To a plurality of printing apparatuses (printers) 102, 103, . . . serving as management targets, a managing apparatus (information processing apparatus) 101 to monitor a status of consumables of each of those printers is connected via a LAN 104 so that it can communicate with each printer. The managing apparatus 101 is connected to an Internet public line 106 via a modem 105 and can communicate with a center of a back end (back end information processing apparatus) for notifying the user of the absence of stock of the various consumables. When a function of the modem 105 is included in the managing apparatus 101, a construction of the modem 105 can be omitted.

The managing apparatus 101 will be described further in detail. In the managing apparatus 101, the total number of sheets printed so far, that is, a variable N(k) of a count value has been stored in a storing portion every printer. As a method of holding it, there is a method whereby the count value of the number of print sheets notified from each printer is obtained by the managing apparatus 101 and held in a predetermined storing portion, or the like.

In the managing apparatus 101, besides the count value of the number of print sheets, an operation time of the image forming apparatus (time expended when the image forming apparatus has been actually driven in order to form an image, or the like), the number of dots corresponding to irradiation of a laser beam onto a drum upon creation of the image, and the like can be stored and held in the variable N(k) of the count value.

Figures 8, 9:
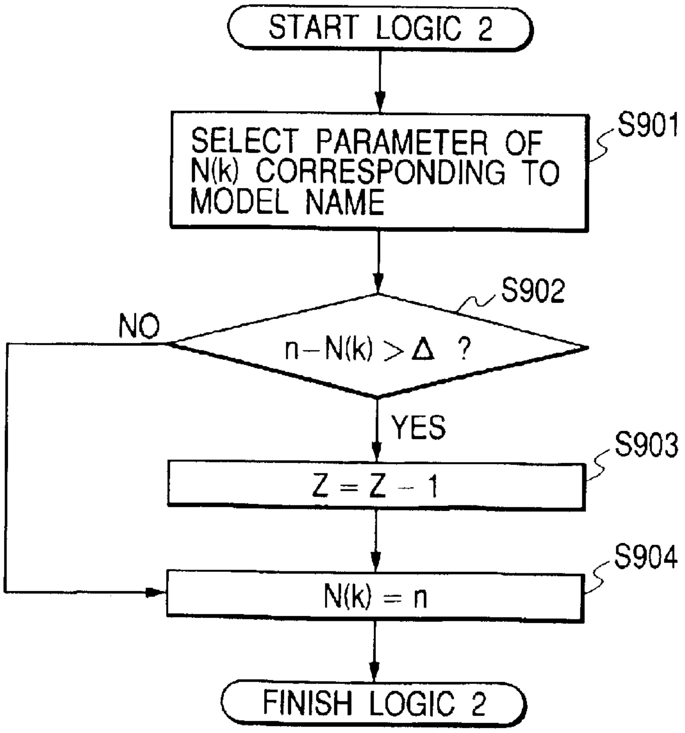
FIG. 8 is a diagram showing a table for specifying a type of consumables from a model name of an obtained color printer in the embodiment.
FIG. 9 is a flowchart showing the operation of the managing apparatus 101 in the embodiment.

The managing apparatus 101 holds the variables N(k) of the count values as histories every printer in correspondence to a change in residual amount of the consumables (from "toner low" to "toner high" or from "toner high" to "toner low") and uses history information of the held count values in a flowchart of FIG. 9, which will be explained hereinlater. FIG. 9 will be described in detail hereinlater.

Figure 2:
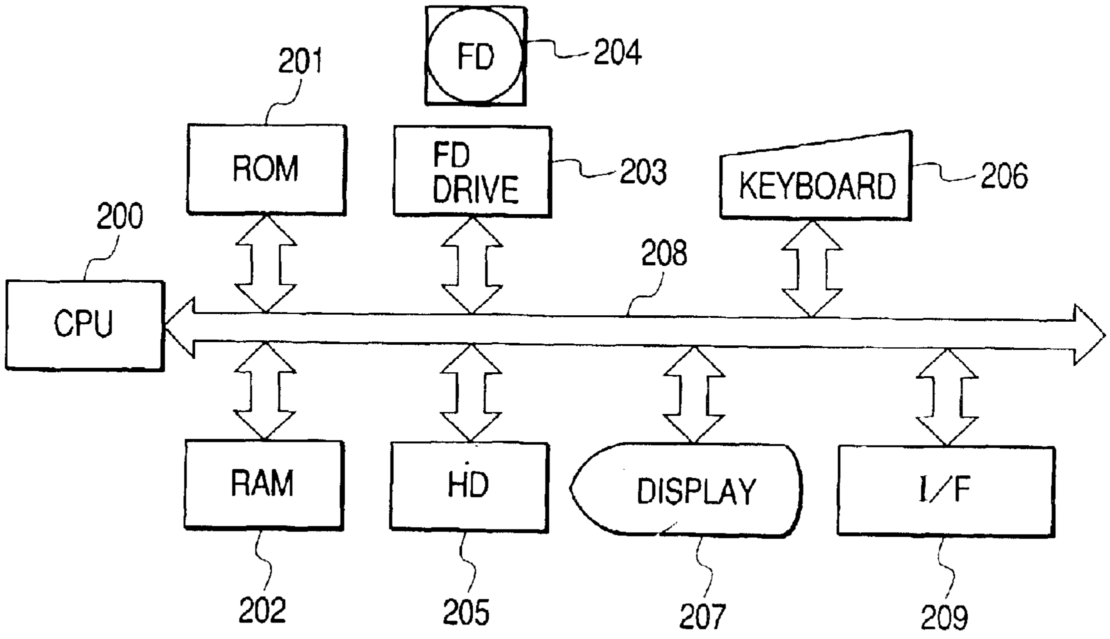
FIG. 2 is a block diagram of an information processing apparatus.

FIG. 2 is a block diagram for explaining the construction of the information processing apparatus according to the invention. It can be made to correspond to the managing apparatus 101 in FIG. 1 or a construction of an information processing apparatus which is provided at a back end (not shown).

In FIG. 2, reference numeral 200 denotes a CPU serving as control means of the information processing apparatus. The CPU 200 makes control to execute an application program, a printer driver program, an OS, a network printer control program of the invention, or the like stored in a hard disk (HD) 205 and temporarily store information, files, and the like necessary for executing the program into a RAM 202. It is assumed that a process in each step in each flowchart, which will be explained hereinlater, is realized by a method whereby the CPU executes processes based on program codes stored in storing means such as 201, 204, 205, or the like.

Reference numeral 201 denotes a ROM serving as storing means. Programs such as a basic I/O program and the like, font data which is used in a document process, and various data such as template data and the like are stored in the ROM 201. Reference numeral 202 denotes the RAM serving as temporary storing means. The RAM 202 functions as a main memory, a work area, or the like of the CPU 200.

Figure 5:
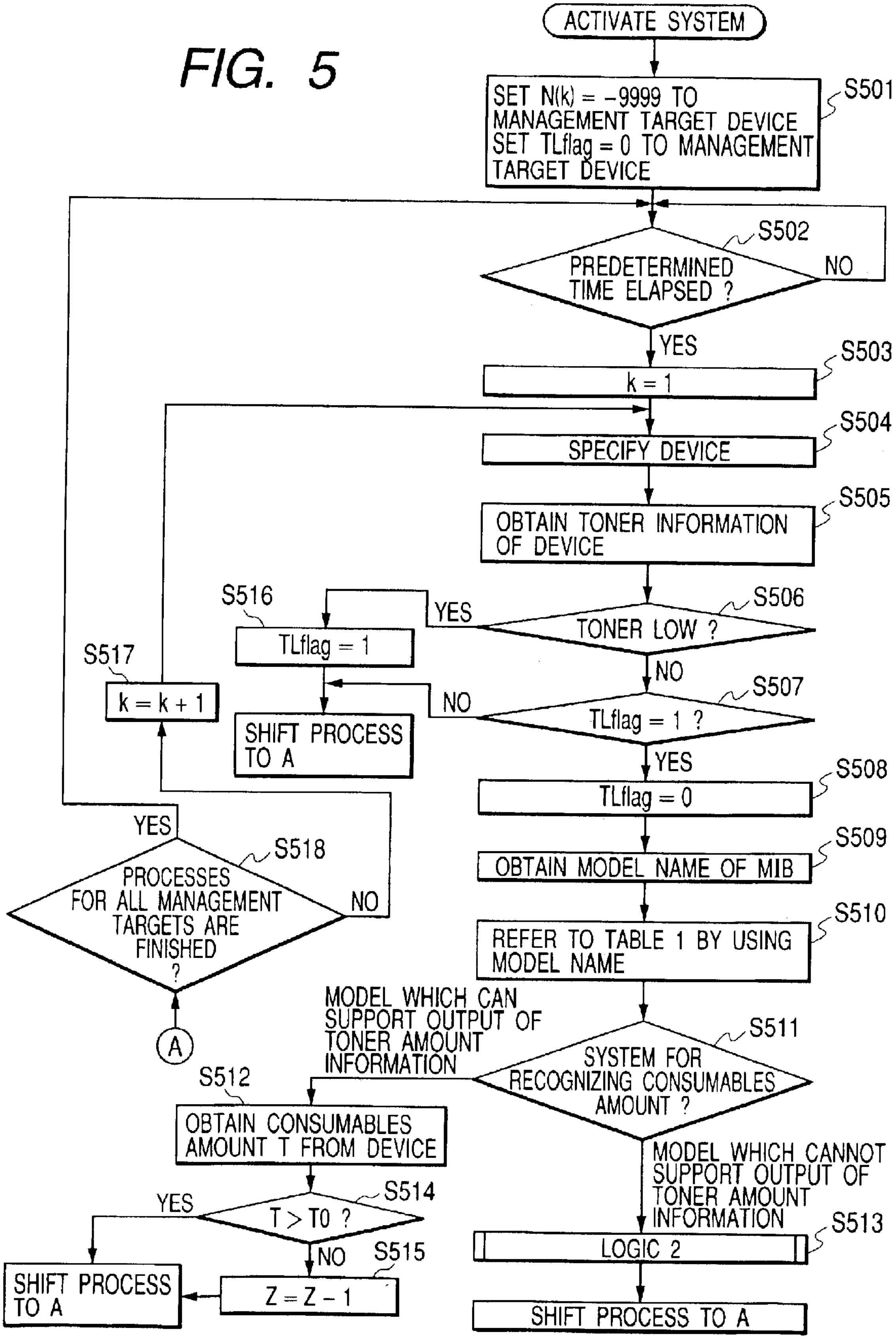
FIG. 5 is a flowchart showing the operation of a managing apparatus 101 in the embodiment.

Reference numeral 203 denotes a floppy (registered trademark) disk (FD) drive serving as memory medium reading means. The FD drive 203 can load a program or the like stored in an FD 204 serving as a memory medium into the present computer system via the FD drive 203 as shown in FIG. 5, which will be explained hereinlater. The memory medium is not limited to the FD but a CD-ROM, a CD-R, a CD-RW, a PC card, a DVD, an IC memory card, an MO, a memory stick, or the like can be arbitrarily used.

Reference numeral 204 denotes the floppy (registered trademark) disk (FD) serving as a memory medium. The FD is the memory medium in which a computer-readable program has been stored.

Reference numeral 205 denotes one of external storing means. For example, it is a hard disk (HD) which functions as a memory of a large capacity. The application program, the printer driver program, the OS, the network printer control program, a related program, and the like have been stored in the HD 205.

Reference numeral 206 denotes a keyboard serving as instruction input means. The user inputs and issues commands such as a device control command and the like to a client computer via the keyboard 206, or the operator or the administrator inputs and issues such commands to a print server via the keyboard.

Reference numeral 207 denotes a display serving as display means for displaying the command inputted from the keyboard 206, a status of the printer, or the like. Actually, there is also a case where a graphic card interprets a draw command issued by the application via a mechanism such as an OS and converts it into an analog signal and information of the converted analog signal is displayed onto the display means, or the like. In the embodiment, it is assumed that "display control" includes a process for generating the draw command via the OS in order to display the information onto the display means.

Reference numeral 208 denotes a system bus for assisting a flow of data in a computer serving as a client or a print server.

Reference numeral 209 denotes an interface serving as input/output means. The information processing apparatus transmits and receives data to/from an external apparatus via the I/F 209.

Figure 3:
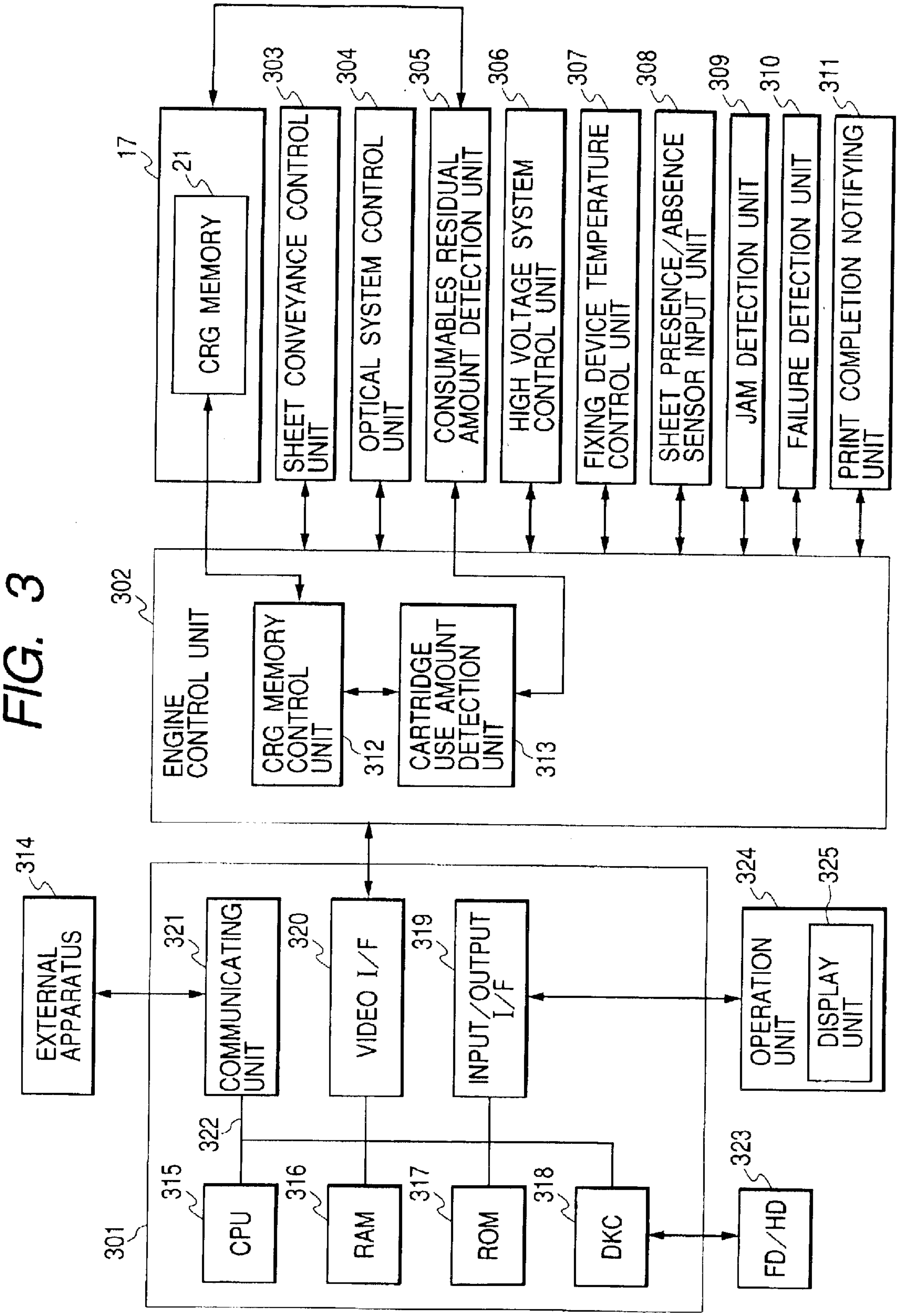
FIG. 3 is a block diagram showing a construction of an image forming apparatus in the embodiment.

FIG. 3 is a block constructional diagram of a printer controller 301 of a printing apparatus (printer) and its peripheral portions in the embodiment.

In the diagram, reference numeral 301 denotes the printer controller comprising: a communicating unit 321 for transmitting and receiving various data to/from an external apparatus 314 such as a host computer (corresponding to the PC 101 in FIG. 1, or the like) in accordance with a predetermined protocol; a video I/F 320 for receiving image data, developing the received image data into information which can be printed by the printer, and transmitting and receiving a signal to/from a printer engine control unit, which will be explained hereinlater, by serial communication; and the like.

A CPU 315 of the image forming apparatus integratedly controls accesses to various devices connected to a system bus 322 on the basis of a control program or the like stored in a ROM 317 or an HD/FD 323 and outputs an image signal as output information to a printer engine connected via the video I/F 320.

Reference numeral 316 denotes a RAM which functions as a main memory, a work area, or the like of the CPU 315.

A memory controller (DKC) 318 controls accesses to an external memory 323 such as hard disk (HD), floppy (registered trademark) disk (FD), or the like for storing a boot program, various applications, font data, user files, edit files, and the like. An operation unit 324 includes a display unit (display panel) 325 and a keyboard, provides information to the operator via an input/output I/F 319, and allows the operator to input an instruction.

Reference numeral 302 denotes an engine control unit for controlling the transmission and reception of the signal to/from the printer controller and controlling each unit of a printer engine via the serial communication. Reference numeral 303 denotes a sheet conveyance control unit for executing sheet conveyance from the feeding of a sheet to be printed to the ejection of the printed sheet on the basis of an instruction of the engine control unit 302. Reference numeral 304 denotes an optical system control unit for executing driving of a scanner motor and making on/off control of the laser beam on the basis of an instruction of the engine control unit 302. Reference numeral 305 denotes a toner residual amount detection unit for detecting a residual amount of the consumables (toner residual amount) in the cartridge and notifying the engine control unit 302 of detection information.

A form of outputting the toner residual amount information detected by the toner residual amount detection unit to the outside differs in dependence on a residual amount detecting method (residual amount outputting method) of the printer, which will be explained hereinlater, and the following various forms are presumed, respectively.

(1) Form in which the detected toner residual amount information is modified to digital values of a plurality of levels, for example, three kinds of levels of (25%, 50%, 75%, . . . ) or the like and outputted to the outside by the engine control unit or the like.

(2) Form in which when a fact that the residual amount of the consumables is equal to or less than a predetermined amount (for example, 30%) is detected by the device side, information showing that the residual amount is once equal to or less than the predetermined amount is stored into a non-volatile memory (for example, non-volatile memory provided in the printer main body, cartridge, or the like), and even if the toner residual amount is increased temporarily by shaking the toner cartridge, the information stored in the non-volatile memory is notified as a toner residual amount to the outside.

(3) Form in which in the case where a residual amount detection sensor is a sensor which copes with the detection of only the presence or absence of the toner, information indicative of the presence or absence of the toner is outputted to the outside.

If there is an obtaining request of the consumables residual amount information from the outside, the warning of the residual amount information based on one of the methods described above is given. Its detailed explanation will be made in FIG. 5.

Reference numeral 306 denotes a high voltage system control unit for generating a high voltage which is necessary for an electrophotographic process such as charging, development, transfer, or the like on the basis of an instruction of the engine control unit 302. Reference numeral 307 denotes a fixing device temperature control unit for controlling a temperature of a fixing device and executing a detection of abnormality of the fixing device, or the like on the basis of an instruction of the engine control unit 302; 308 a sheet presence/absence sensor input unit for transferring information of sheet presence/absence sensors provided in a paper feeding unit and a sheet conveying path to the engine control unit 302; 309 a jam detection unit for detecting a conveyance defect during the sheet conveyance; 310 a failure detection unit for detecting a failure of a function portion in the printer; 311 a print completion notifying unit for detecting that the printing has normally been executed and notifying the engine control unit 302 of the completion of the printing; and 17 a consumables cartridge filled with consumables such as toner or the like which is detachable from the printer engine. A non-volatile memory 21 which can transmit and receive data to/from the engine control unit 302 has been provided in the consumables cartridge 17. The data can be read out from or written into the engine control unit 302.

Information such as use start day of a developing agent, residual amount of the developing agent, and the like is stored in the non-volatile memory (also referred to as non-volatile storing means) 21. The non-volatile memory 21 is not particularly limited but any memory such as an NV (Non-Volatile) RAM can be used so long as the memory stores and holds signal information so that it can be rewritten.

Returning to the explanation of FIG. 3, a memory control unit 312 is provided in the engine control unit 302 and has a function for reading out the data from the non-volatile memory 21 and rewriting contents therein. Reference numeral 313 denotes a cartridge use amount detection unit which is provided in the engine control unit 302 and has a function for discriminating a service life of the toner cartridge 17 on the basis of the information from the consumables residual amount detection unit 305 and transferring its discrimination information to the memory control unit.

The CRG memory control unit 312 has: a function for executing the operation to read data (address) designated from the printer controller via the video I/F in response to a reading request of the CRG memory from the printer controller and notifying a printer controller of the read data; and a function for executing the operation to write the data (address) designated from the printer controller into the CRG memory via the video I/F 320 in response to a writing request of the CRG memory from the printer controller.

As a printer in the invention, besides the laser beam printer using the electrophotographic type as described above, it is possible to apply a printer such as ink jet printer using an ink jet type, thermal head printer using a thermal transfer type, digital hybrid apparatus integratedly having functions of a copying apparatus, a facsimile apparatus, a printer, and the like, or the like. Further, the consumables are not limited to the toner which is used to record an image (form an image) onto a recording medium such as paper or the like in the electrophotographic type but the invention can be also applied to ink, sheets, needles which are used upon stapling, and the like.

A further specific example of the printer in the embodiment of the invention will be described. When a fact that the residual amount of the consumables is equal to or less than the threshold value in the printer is recognized, an empty signal (low signal) to notify the user of a result of the recognition is notified from the printer to the managing apparatus 101 in response to a trap of an SNMP (Simple Network Management Protocol) or an information request (polling) from the managing apparatus 101 to the printer.

Figure 4:
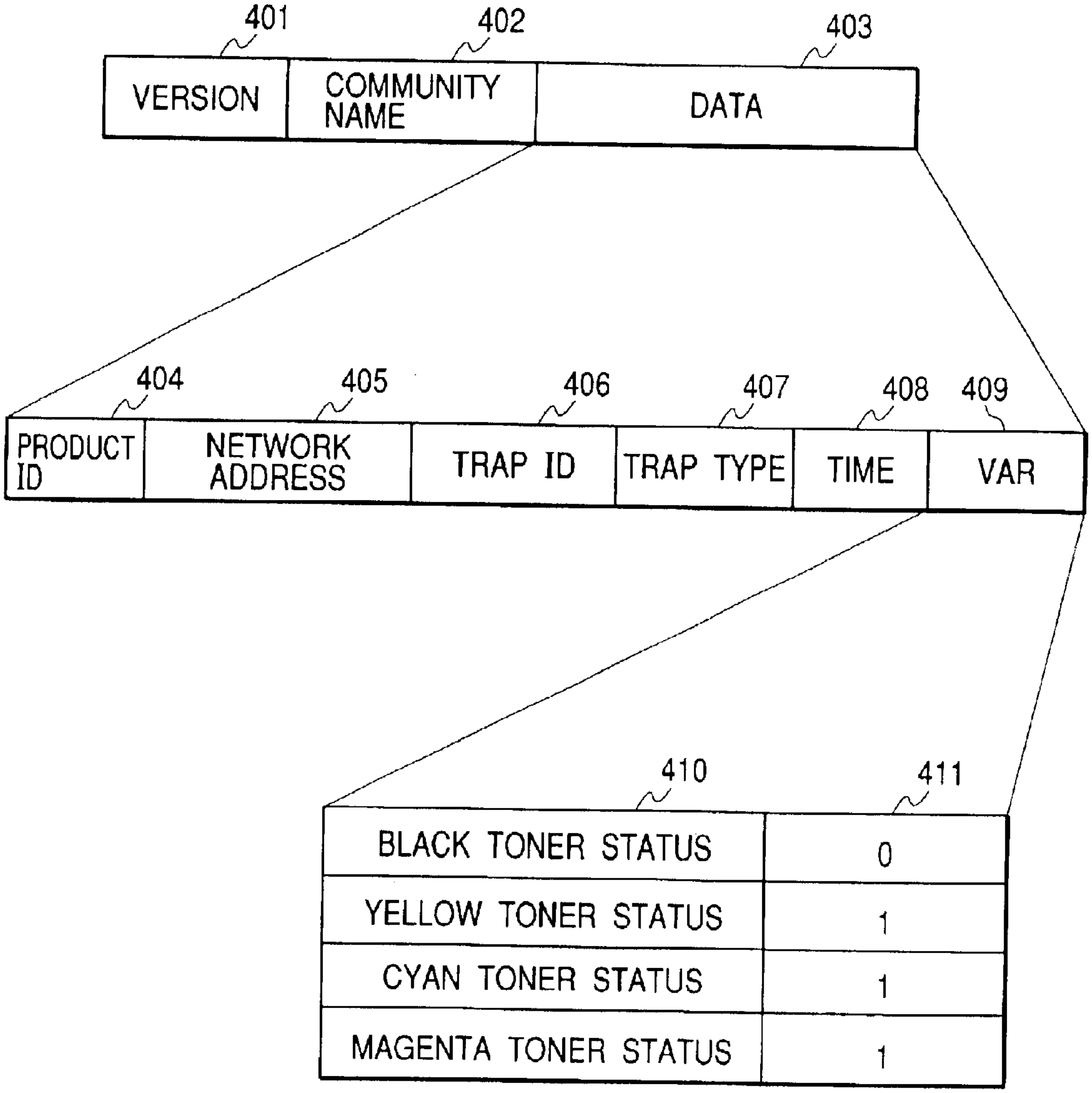
FIG. 4 is a schematic diagram for explaining an MIB value for expressing printer information including residual amount information.

FIG. 4 shows an example of a data structure of the low signal. It is assumed that "toner low" in the embodiment denotes a state where the residual amount of the consumables is equal to or less than a predetermined amount (for example, 10 g or less) or a predetermined percent (for example, 10% or less). Reference numeral 401 denotes a version of the MIB; 402 a community name; and 403 data. Contents of the data 403 further have a structure as shown by 404 to 409. Reference numeral 404 denotes a product ID; 405 a network address (ip address); 406 a trap ID; 407 a trap type; 408 time; and 409 a data portion of a variable length, respectively. A specific status of the use amount/residual amount of the consumables is described in the area 409. As a status of the consumables, a status in which the toner is empty and a status in which the toner residual amount is equal to 10% or 50% are presumed. A type of consumables (a situation in which even when the types of printers are different, the same type of consumables are used is also presumed) is described in an area 410. The status is described in an area 411. In the area 411, if the residual amount of the consumables is equal to or less than a threshold value, "0" is stored and if it is larger than the threshold value, "1" is stored. In the example of FIG. 4, the residual amount of only black toner is equal to or less than the threshold value. It is naturally presumed that by expressing the information in the area 411 by a multi-bit, more detailed information of the residual amount of a plurality of levels can be expressed. In each process of a managing apparatus, which will be explained hereinlater, the data structure of FIG. 4 described above is applied to the information notified from the printer.

Subsequently, a flow of processes in the invention will be described with reference to a flowchart of FIG. 5. It is assumed that the process in each step shown in the flowchart of FIG. 5 is realized by a method whereby a CPU provided for the managing apparatus shown in FIG. 1 reads out and executes the control program of the invention stored in the non-volatile storing means such as ROM, hard disk, or the like.

First, an initializing process after the activation of the system associated with a power-on is executed in S501. Specifically speaking, a process such that the managing apparatus 101 stores sufficiently small values into N(k) of all devices serving as management targets is executed. For example, "−9999" is substituted. It is presumed that the device (printer) serving as a management target is a device obtained as the result of a device search by the managing apparatus 101 showing that the device can communicate on the network or a plurality of devices which have previously been registered in a predetermined storing portion of the managing apparatus. A setting process of N(k) can be omitted in the case of a "model which can support output of toner amount information".

As a similar initializing process, in S501, "0" is set into a flag TLflag indicative of a toner-low status. Referring to FIG. 4, a process for allowing the system to wait for a predetermined time (for example, a sleep for 5 minutes is performed) is executed in S502. For example, if the predetermined time is equal to 5 minutes, the status information (including at least the toner residual amount) is requested (polling) from the device at intervals of 5 minutes.

After it was confirmed by the managing apparatus 101 that the predetermined time has elapsed in S502, first, the device serving as a target of processes in step S505 and subsequent steps is specified via steps S503 and S504.

In S505, the toner residual amount (toner low) of the device is obtained by the SNMP. Specifically speaking, whether the toner residual amount is in the toner-low status or not can be discriminated with reference to a prtAlertDescription table of the MIB.

If it is determined that the toner residual amount is in the toner-low status, step S516 follows and if NO, the processing routine advances to S507.

In S516, "1" is set into the flag TLflag and S518 follows.

In S507, the value of TLflag is referred to. If it is equal to "1", S508 follows. If NO, S518 follows. If the value of TLflag is equal to "1" in S507, this means that the toner-low status has been solved (showing that the status has been changed from "toner low" to "toner high" (at least, it is not "toner low")).

It is presumed that at this point of time, in the managing apparatus 101, histories of the count values of the operation regarding the image forming operation in the printer corresponding to the change in residual amount of the consumables (from "toner low" to "toner high" or from "toner high" to "toner low") has been also stored in a predetermined storing portion. For example, a history such that the count value when the processing routine has been shifted to S508 at the previous time is equal to 5000 and the count value when the processing routine is shifted to S508 at the present time is equal to 5050 or the like is managed.

In S508, "0" is set to TLflag because the status of the toner residual amount is not the toner-low status.

Subsequent to S508, in S509, the model name of the printer is obtained by the SNMP from the device by using the protocol of MIB. Specifically speaking, a sysDescr table of MIB is referred to.

In S510, the table is referred to by using the obtained model name so as to specify (recognize) what kind of use amount/residual amount detecting method (also the outputting method) the device to which the printer prepared by the present system corresponds uses. As another form, a method whereby the information showing the use amount/residual amount detecting method is directly obtained from the printer via the communication line by means for recognizing information to identify the residual amount detecting method and recognized is also presumed.

In S511, whether this printer is an apparatus which can accurately output the toner amount or not is discriminated. A different discriminating method is selected and used as discriminating means by the process in S511. Whether the consumables have newly been supplemented into the printer or not, that is, whether a cartridge filled with the consumables has newly been exchanged or not can be discriminated by the discriminating method (the discriminating method in S512 to S514 or the discriminating method corresponding to logic 2) according to the residual amount detecting method of the consumables of the printer.

Although the case of using the exchange discriminating method of the cartridge corresponding to the two residual amount detecting methods has been described in the process in S511, the invention is not limited to it. If there are a plurality of residual amount detecting methods such as first method, second method, third method, . . . , whether a cartridge corresponding to each residual amount detecting method has newly been exchanged or not is discriminated.

FIG. 6 shows an example of a table for recognizing the information to identify the residual amount detecting method of the printer which is referred to in S510. A column 601 shows an example of the model names and a column 602 shows whether each printer can support the output of the toner amount information or not. The printer which can support it is shown by "1" and the printer which cannot support it is shown by "0".

It is assumed that the printer of the type which can support the output of the toner amount information in the embodiment corresponds to the model having the residual amount detecting method which can continuously and accurately recognize the toner residual amount information (for example, 25%, 50%, 75%, . . . ) finely divided into a plurality of levels by the self apparatus in accordance with the elapse of time and the printer can notify the outside of the recognized accurate toner residual amount information. This method corresponds to the form (2) in which the toner residual amount information is outputted to the outside or the like as described in FIG. 3 and corresponds to the residual amount detecting method of outputting the residual amount information based on the residual amount information stored in the non-volatile storing portion. As described in FIG. 3, this residual amount detecting method corresponds to the residual amount outputting method whereby the information of the history in which the residual amount is once equal to or less than the predetermined amount (for example, 25%, 50%, 75%) is stored and once the history is stored, even if the value of the residual amount which is detected by the sensor provided for the toner cartridge is increased from 25% to 50% by the user's shaking operation of the cartridge, 25% based on the history information is outputted so as to notify it to the outside.

The printer which cannot support the output of the toner amount information is a device using the residual amount detecting method of detecting "there is enough toner", "residual amount is little", "there is no toner", or the like. It corresponds to a device such that in the case of notifying the outside of the residual amount information, the finely-divided continuous residual amount information such as 25%, 50%, 75%, . . . cannot be accurately outputted. In other words, when the printer cannot support the output of the toner amount information, it corresponds to a method whereby when the toner residual amount which is detected by the sensor provided for the toner cartridge is changed from "there is no toner" to "residual amount is little", the toner residual amount is outputted as "residual amount is little" to the outside.

Returning to the description of FIG. 5, in step S510, a process for specifying a type (cartridge model or the like) of the consumables corresponding to the device on the basis of the model name obtained in step S509 is also included.

FIGS. 7 and 8 show examples of tables which are used when the model name is obtained.

FIG. 7 shows the example of the table for searching consumables of black and white toner. A name (model name) to specify the printer is stored in a column 701. A toner name corresponding to it is stored in a column 702.

FIG. 8 shows the example of the table for searching consumables of color toner. Since four colors of yellow, magenta, cyan, and black are used in the color toner, a toner name (802) can be searched from a name (801) of the printer every color. As a method of specifying the model of the consumables, even if the model name of the consumables which has previously been stored in the printer is obtained, the obtainment of the model name of the consumables is realized.

If it is determined in S511 that the printer is the device which can support the output of the toner amount information (the second residual amount outputting method), the processing routine advances to S512 and a toner amount T is obtained from the device. The printer engine obtains this value from a prtMarkerSuppliesLevel (by units of "g" or "%") table. In the process in step S510, the managing apparatus or image forming apparatus can directly obtain a signal indicative of the use amount/residual amount detecting method from the printer via the network.

The obtained toner amount T is compared with a preset threshold value T0 in S514. T0 is set to 70% in the embodiment. After the residual amount is set to the toner-low status, for example, even if the user shakes the toner cartridge, the toner amount cannot be equal to or larger than 70%. Therefore, precision is hardly influenced by the value of the threshold value T0 and this value can be easily set. If T>T0 in S514, since the residual toner is still enough, a process for stock subtraction is not performed but the processing routine advances to S518. If T≦T0, in S515, "1" is subtracted from the number of stocks (Z) of the consumables of the type specified in S510.

As another form, if the discrimination result (YES/NO) in step S514 is exchanged and under the conditions such that the discrimination result in S506 is NO and that in S507 is YES, that is, the problem of the absence of the toner has been solved, if the toner amount T is equal to or larger than the predetermined value (for example, T0=70%) in S514, the number of stocks (Z) is subtracted by "1". By this method, it is possible to precisely detect that the toner-low status could be solved by exchanging the consumables cartridge. The accurate stock subtraction in association with the exchange of the consumables cartridge can be performed. The stock subtraction of the consumables of the model which can support the output of the toner amount information can be supported.

If it is determined in S511 that the printer is not the model which can support the output of the toner amount information (the first residual amount detecting method), S513 follows and the printer is subjected to another discriminating condition logic 2. Logic 2 will be explained in detail hereinbelow in conjunction with FIG. 9.

FIG. 9 is a flowchart for explaining logic 2. Now, assuming that the target printer (specified in S504) is "k", whether the target printer can notify the managing apparatus 101 of print number information (operation information) or not is discriminated in S901. This discrimination is made by referring to a table of "possible (can be notified)/impossible (cannot be notified)" corresponding to the model name which has previously been provided in the managing apparatus. If it is determined that the number of print sheets (operation information) can be notified, the number of print sheets is used as a parameter. If it is determined that the number of print sheets cannot be notified, the operation time or the number of pixels associated with the image creation is used as a parameter. The case where the information of the number of print sheets is used as a parameter in S901 will be described hereinbelow.

A current count number "n" (assumed to be the latest history) of the number of print sheets which can be obtained from the printer is compared with the history of the reference number of sheets N(k) in the previous toner-low status which has been stored. Whether a difference (interval) (that is, n−N(k)) between (n) associated with the change in residual amount and N(k) corresponding to the history is larger than a predetermined threshold value Δ or not is calculated and discriminated in S902.

The reference number of sheets N(k) will be described further in detail. The count number in the case where after the toner-low status or toner empty status occurred, this status is solved is used as the reference number of sheets N(k). If the toner-low status and the status where it has been solved occur continuously, it is regarded that a possibility that the discrimination result in S902 in FIG. 9 is YES is equal to zero (ordinarily, it is determined to be NO).

In the case where the toner-low status occurred and the toner cartridge has been exchanged, so that the toner-low status is solved and the exchanged toner cartridge is continuously used, if the toner-low status occurs and the cartridge is exchanged or the toner-low status is solved by shaking the toner cartridge (in the case where the residual amount changes), it is determined that the discrimination result in S902 in FIG. 9 is YES. This process corresponds to a process for discriminating that if the toner-low status is solved by exchanging the old toner cartridge to the new toner cartridge, a sufficiently long time is required until the toner-low status occurs next.

If YES in S902, S903 follows and the variable Z indicative of the number of stocks of the consumables of the type specified in S510 is subtracted by 1. If NO, S903 is skipped and S904 follows. In S904, the reference number of sheets N(k) is replaced with the current count number (n). In S904, the process of logic 2 is once finished and the processing routine advances to S518.

Although the processes in FIG. 9 have been described as a flowchart which is executed when the toner-low status is solved, from a viewpoint that the exchange of the consumables is accurately recognized, similar effects can be obtained by setting the count number at the timing when the toner-low status occurs from a state where the toner-low status has been solved to n and N(k), respectively.

Returning to the explanation of FIG. 5, whether the processes have been finished with respect to all of the devices serving as management targets or not is discriminated in step S518. If YES, the processing routine advances to S502 for making the system wait for a predetermined time again.

If NO in S518, S517 follows and a process for shifting the management target to the next device is executed.

As described above, according to the flowchart of FIG. 5, even in the network environment such that the devices (printers) using the various residual amount detecting methods exist mixedly, the exchange record (for example, S514) of the consumables or a presumption such that the consumables will be exchanged (for example, logic 2) is properly recognized by the managing apparatus. Further, in the network image forming environment such that the various consumables residual amount detecting methods exist mixedly, the information processing apparatus which can flexibly make the stock management associated with the exchange of the consumables can be provided. An effect such that the proper exchange record of the consumables or the proper exchange schedule is managed can be obtained.

According to the flowchart of FIG. 5, since not only the supplement of the new consumables in the printer is flexibly recognized in correspondence to the residual amount detecting method but also the proper parameters can be used upon execution of steps S902 to S904 in the flowchart of FIG. 9, it is possible to cope with the more flexible network print environment. For example, in the form such that the stock subtraction is performed each time the toner-low status occurs, a situation such that the user shakes the toner cartridge, thereby eliminating the toner-low status once, and when the toner-low status occurs again, the stock subtraction is erroneously performed can be prevented.

As described above, the fact that the consumables of the image forming apparatus have been exchanged by the user can be accurately grasped by the managing apparatus since the managing apparatus 101 executed the processes in the flowchart of FIG. 5, so that the stock management of the consumables can be made at high precision.

By the processes in steps S516, S506, and S507, the change in residual amount of the consumables is monitored and the stock managing process in step S509 and subsequent steps is executed in accordance with a result of the monitoring. Therefore, as compared with the form such that the process regarding the stock management is executed each time the toner-low status occurs, a processing load on the managing apparatus 101 can be reduced.

Since the process in step S510 can be executed on the basis of the table as shown in FIG. 6, even if the image forming apparatus using the various toner residual amount detecting methods and the detected residual amount outputting method exists on the network, the consumables can be unitarily and automatically managed and the tiresomeness of the user/service person can be omitted. In other words, there is no need to provide the consumables managing apparatus corresponding to the residual amount outputting method of each image forming apparatus and a tiring operation such that the administrator or the like sets the stock managing method according to the residual amount outputting method of each image forming apparatus can be solved.

Second Embodiment

In the first embodiment, whether the printer is the model which can output the toner amount information or not has been discriminated by referring to the table which has been prepared in the managing apparatus (information processing apparatus). However, if this table has successfully been referred to by directly referring to prtMarkerSuppliesLevel, it is also possible to determine that the printer is the model which can output the toner amount information.

There is also presumed a form such that whether the number of stocks is equal to or less than a predetermined value or not is discriminated in association with the subtraction of the number of stocks of predetermined consumables according to the subtracting process in S515 or S904, if it is determined that the number of stocks is equal to or less than the predetermined value, an external maintenance center server is warned of such a fact that the number of stocks is equal to or less than the predetermined value via a predetermined communication line. Such a warning is given by the managing apparatus and both of an ID of the managing apparatus and customer specifying information (company name, etc.) are also notified together with the warning information. In the maintenance center server which has been warned, warning information indicative of the lack of stock of the predetermined consumables of each predetermined managing apparatus and each predetermined customer is displayed, thereby enabling the operator to be notified of the lack of the stock number by such a display.

Third Embodiment

Although the toner-low status of the target printer has always been monitored every five minutes in the first embodiment, it is also possible to obtain an event at the time when the toner-low status occurs by trap of MIB and monitor only the printers in which the toner-low status occurred. Naturally, the third embodiment can be applied to the second embodiment.

Fourth Embodiment

The information in FIGS. 6 to 8 described in the first to third embodiments has been held in the storing portion of the managing apparatus 101.

However, it is also presumed that a printer of a new model or a toner cartridge (consumables) of a new model is sold. That is, in the form such that the information in FIGS. 6 to 8 is previously and fixedly held in the storing portion of the managing apparatus 101, a problem such that it is impossible to cope with such a presumption is caused.

Therefore, if the managing apparatus 101 in the first to third embodiments is provided with updating means for periodically updating the information in FIGS. 6 to 8, it is possible to cope with a situation such that a new printer or consumables are sold. Since the system including the managing apparatus 101 in the fourth embodiment has a construction and functions which are fundamentally similar to those described in the first to third embodiments, their overlapped description is omitted.

The updating means has a function of obtaining the latest table information in FIGS. 6 to 8 which is sent from the external apparatus which can communicate via the Internet public line 106.

The information of the table can be obtained from the external apparatus by one of the following methods, that is: a method whereby the managing apparatus 101 periodically requests the information of the external apparatus; a method whereby the managing apparatus 101 receives the latest table information which is spontaneously distributed from the external apparatus; or a method whereby by loading a memory medium into the managing apparatus 101, the latest table information in FIGS. 6 to 8 stored in the loaded memory medium is read out and held in the managing apparatus 101 and contents stored in the storing portion are updated.

It is also possible to make the updating means of the managing apparatus 101 obtain information of a portion corresponding to an updated new model in the information of the table which is managed by the external apparatus.

As described above, according to the invention, the fact that the consumables of the image forming apparatus have been exchanged by the user can be accurately grasped by the managing apparatus, so that an effect such that the stock management of the consumables can be made at high precision can be obtained.

What is claimed is:

1. A system for monitoring a plurality of printing apparatuses and for unitarily performing management associated with consumables which are used for recording onto a recording medium with respect to each of the plurality of printing apparatuses, comprising:

a receiver that receives information on a residual-amount of a consumable from any one of the plurality of printing apparatuses;

a selector that selects a residual-amount evaluation method corresponding to a residual-amount outputting method of the consumable that is used by the one printing apparatus based on the information received by said receiver; and a stock manager that manages the number of stocks of the consumable based on an evaluation result obtained by the residual-amount evaluation method selected by said selector, wherein methods available for use as the residual-amount outputting method include a first residual-amount outputting method of outputting residual-amount information detected by residual-amount detecting means provided for the one printing apparatus and a second residual-amount outputting method of outputting residual-amount information based on residual-amount history information stored in a non-volatile storing portion provided for the consumable, wherein said selector selects a first residual-amount evaluation method if the residual-amount outputting method is the first residual-amount outputting method and selects a second residual-amount evaluation method if the residual-amount outputting method is the second residual-amount outputting method, and wherein the first residual-amount method evaluates an interval of toner-low and toner-high statuses and the second residual-amount evaluation method evaluates change in residual amount without evaluation of the interval.

2. A method for monitoring a plurality of printing apparatuses and for unitarily performing management associated with consumables which are used for recording onto a recording medium with respect to each of the plurality of printing apparatuses, comprising:

a receiving step, of receiving information on a residual-amount of a consumable form any one of the plurality of printing apparatuses;

a selecting step, of selecting a residual-amount evaluation method corresponding to a residual-amount outputting method of the consumable that is used by the one printing apparatuses based on the received information; and a stock managing step, of managing the number of stocks of the consumable based on an evaluation result obtained by the selected residual-amount evaluation method, wherein methods available for use as the residual-amount outputting method include a first residual-amount outputting method of outputting residual-amount information detected in the one printing apparatus and a second residual-amount outputting method of outputting residual-amount information based on residual-amount history information stored in a non-volatile storing portion provided for the consumable, wherein said selecting step includes selecting a first residual-amount evaluation method if the residual-amount outputting method is the first residual-amount outputting method and selecting a second residual-amount evaluation method if the residual-amount outputting method is the second residual-amount outputting method, and wherein the first residual-amount evaluation method evaluates an interval of toner-low and toner-high statuses and the second residual-amount evaluation method evaluates change in residual amount without evaluation of the interval.

3. A program stored on a computer-executable medium, the program executed by an information processing apparatus for monitoring a plurality of printing apparatuses and for unitarily performing management associated with consumables which are used for recording onto a recording medium with respect to each of the plurality of printing apparatuses, the program comprising code for executing:

a receiving step, of receiving information on a residual-amount of a consumable form any one of the plurality of printing apparatuses;

a selecting step, of selecting a residual-amount evaluation method corresponding to a residual-amount outputting method of the consumable that is used by the one printing apparatuses based on the received information; and a stock managing step, of managing the number of stocks of the consumable based on an evaluation result obtained by the selected residual-amount evaluation method, wherein methods available for use as the residual-amount outputting method include a first residual-amount outputting method of outputting residual-amount information detected in the one printing apparatus and a second residual-amount outputting method of outputting residual-amount information based on residual-amount history information stored in a non-volatile storing portion provided for the consumable, wherein said selecting step includes selecting a first residual-amount evaluation method if the residual-amount outputting method is the first residual-amount outputting method and selecting a second residual-amount evaluation method if the residual-amount outputting method is the second residual-amount outputting method, and wherein the first residual-amount evaluation method evaluates an interval of toner-low and toner-high statuses and the second residual-amount evaluation method evaluates change in residual amount without evaluation of the interval.

* * * * *

UNITED STATES PATENT AND TRADEMARK OFFICE

CERTIFICATE OF CORRECTION

PATENT NO. : 7,099,779 B2 
APPLICATION NO. : 10/417089
DATED : August 29, 2006
INVENTOR(S) : Toru Niki It is certified that error appears in the above-identified patent and that said Letters Patent is hereby corrected as shown below:

COLUMN 1:
Line 32, “an” should read -- a --.

COLUMN 2:
Line 60, “portion” should read -- portion for --.

COLUMN 3:
Line 8, “histories” should read -- histories for --;
Line 22, “makes control to execute” should read --controls execution of --; and
Line 25, “temporarily store” should read -- temporary storing of --.

COLUMN 9:
Line 24, “every” should read -- for every --.

COLUMN 10:
Line 55, “once finished” should read -- finished once --.

COLUMN 13 :
Line 27, “wherein” should read -- ¶ wherein --;
Line 54, “form” should read -- from --; and
Line 59, “apparatuses” should read -- apparatus --.

COLUMN 14:
Line 31, “form” should read -- from --; and
Line 36, “apparatuses” should read -- apparatus --.

Signed and Sealed this

Fifth Day of June, 2007

JON W. DUDAS
*Director of the United States Patent and Trademark Office*